United States Patent
Vivier

(10) Patent No.: US 12,544,324 B2
(45) Date of Patent: Feb. 10, 2026

(54) HIGH CONCENTRATION VITAMIN C TOPICAL COMPOSITIONS AND METHOD OF MAKING SAME

(71) Applicant: VIVIER CANADA INC., Vaudreuil-Dorion (CA)

(72) Inventor: Ghislain Vivier, St-Lazare (CA)

(73) Assignee: VIVIER CANADA INC., Vaudreuil-Dorion (CA)

( * ) Notice: Subject to any disclaimer, the term of this patent is extended or adjusted under 35 U.S.C. 154(b) by 1017 days.

(21) Appl. No.: 17/310,151

(22) PCT Filed: Feb. 7, 2020

(86) PCT No.: PCT/CA2020/050159
§ 371 (c)(1),
(2) Date: Jul. 21, 2021

(87) PCT Pub. No.: WO2020/163942
PCT Pub. Date: Aug. 20, 2020

(65) Prior Publication Data
US 2022/0117873 A1  Apr. 21, 2022

Related U.S. Application Data

(60) Provisional application No. 62/804,304, filed on Feb. 12, 2019.

(51) Int. Cl.
| | | |
|---|---|---|
| *A61K 8/41* | (2006.01) |
| *A61K 8/34* | (2006.01) |
| *A61K 8/67* | (2006.01) |
| *A61Q 19/08* | (2006.01) |

(52) U.S. Cl.
CPC ............. *A61K 8/676* (2013.01); *A61K 8/345* (2013.01); *A61K 8/41* (2013.01); *A61Q 19/08* (2013.01)

(58) Field of Classification Search
None
See application file for complete search history.

(56) References Cited

U.S. PATENT DOCUMENTS

| | | | |
|---|---|---|---|
| 5,885,982 A | 3/1999 | Dolynchuk et al. |
| 7,342,045 B2 * | 3/2008 | Vivier ..................... A61P 17/00 |
| | | | 514/474 |
| 2012/0225107 A1 | 9/2012 | Hechavarria |
| 2017/0209522 A1 | 7/2017 | Haga |
| 2020/0281872 A1 | 9/2020 | Vivier |

FOREIGN PATENT DOCUMENTS

| | | | | |
|---|---|---|---|---|
| CA | 2508095 A1 * | 11/2006 | ........... A61K 31/205 |
| CA | 2706630 A1 | 6/2009 |
| EP | 2604254 B1 | 12/2016 |
| JP | 4789464 B2 * | 10/2011 |
| WO | 9951213 A2 | 10/1999 |
| WO | 2006048671 A1 | 5/2006 |
| WO | 2007041230 A2 | 4/2007 |
| WO | 2012175686 A2 | 12/2012 |
| WO | 201809149 A1 | 5/2018 |
| WO | WO-2018232527 A1 * | 12/2018 | ........... A61K 31/355 |

OTHER PUBLICATIONS

Johnson W, Bergfeld WF, Belsito DV, et al. Safety Assessment of 1,2-Glycols as Used in Cosmetics. International Journal of Toxicology. 2012;31(5_suppl):147S-168S. (Year: 2012).*
Johnson, W. et al. International Journal of Toxicology, 2012, 31(5_suppl), 147S-168S (Year: 2012).*
Dolynchuk et al., Effect of putrescine on tissue transglutaminase activity in wounds: decreased breaking strength and increased matrix fucoprotein solubility, plastic and reconstructive surgery, 1994, pp. 567-573, vol. 93.
Dolynchuk, Inhibition of tissue transglutaminase and e (gamma-glutamyl) lysine cross-linking in human hypertrophic scar, Wound Repair and Regeneration, 1996, pp. 16-20, vol. 4.
Dolynchuk et al., Topical putrescine (Fibrostat) in treatment of hypertrophic scars: phase II study, Plastic and Reconstructive Surgery, 1996, p. 117-23; discussion p. 124-5, vol. 97.
International Searching Authority, International search report and written opinion, Mar. 21, 2018, pp. 1-13, Canada.
Jeong et al., Resurfacing of pitted facial acne scars with a long-pulsed er: YAG Laser, The American Society for Dermatologic Sergery Inc., Feb. 2001, pp. 107-110.
Lynde, Moisturizers: What they are and how they work, Skin Therapy Letter, Dec. 2001, https://www.skintherapyletter.com/eczema/how-moisturizers-work/, vol. 6 No. 13.
Mackay et al., Nutritional Support for Wound Healing, Alternative Medicine Review, 2003, pp. 359-377, vol. 8 No. 4.
Rowe et al., Handbook of Pharmaceutical Excipients sixth edition, The Pharmaceutical Press and American Pharmacists Association, 2009, 917 pages.

(Continued)

*Primary Examiner* — Clinton A Brooks
*Assistant Examiner* — Nicola Maria Bauer
(74) *Attorney, Agent, or Firm* — Lavery, de Billy, L.L.P.; Julie Gauvreau

(57) ABSTRACT

A cosmetic formulation comprising at least 16% of a vitamin C compound (w/w) and at least one cosmetically acceptable carrier is provided. The formulation is useful for treating skin, in particular for reducing or improving skin conditions such as roughness, flakiness, tightness, dehydration, loss of skin thickness, loss of skin firmness, lack of elasticity, wrinkles, lines and spots. The formulation can be prepared in several steps, which include the repeated, alternating additions of portions of the vitamin C compound and glycol-based solvent(s) to an aqueous solvent, where heat is applied to the mixture to help dissolve the last portion(s) of the vitamin C compound.

10 Claims, No Drawings

(56) References Cited

OTHER PUBLICATIONS

Traikovitch, Use of Topical Ascorbic Acid and Its Effects on Photodamaged Skin Topography, Arch Otolaryngol head neck Surg., Oct. 1999, pp. 1091-1098, vol. 125.

Vivier, V-STAT Advanced Scar Gel (30 ml), Vivier Pharma Inc., May 24, 2017, https://www.vivierpharma.com/en_US/v-stat-advanced-scar-gel-30ml.

Vivier, V-STAT TM, Vivier Pharma Inc., May 24, 2017, https://www.vivierpharma.com/en_US/v-stat/.

Vivier, Vivier Pharma launches V-STAT Advanced Scar Gel, PR Web, May 24, 2017, https://www.prweb.com/releases/2017/05/prweb14362706.htm.

Spec-Chem Ind, China, 2014, pp. 1-2. (Year: 2014).

Aprahamian M. et al., "Effects of supplemental pantothenic acid on wound healing: experimental study in rabbit", Am J Clin Nutr. Mar. 1985: 41 (3):578-89 (abstract only is attached). (Year: 1985).

USPTO Restriction Requirement dated Jul. 2, 2020 in U.S. Appl. No. 16/883,864.

USPTO Non Final Rejection dated Nov. 12, 2020 in U.S. Appl. No. 16/883,864.

PCT/CA2020/050159, International search report and written opinion, Apr. 23, 2020 pp. 1-10, Canada.

Mcdermott, A., "Six of the Best Face Serums to Fight Ageing Skin". The Irish Times, Jul. 4, 2016—Retrieved from the Internet: https://www.irishtimes.com/life-and-style/fashion/beauty /six-of-the-best-face-serums-to-fight-ageing-skin-1.2709913 *Entire document*.

\* cited by examiner

HIGH CONCENTRATION VITAMIN C TOPICAL COMPOSITIONS AND METHOD OF MAKING SAME

CROSS REFERENCE TO RELATED APPLICATIONS

This application is a National Entry Application of PCT application Serial No PCT/CA2020/050159 filed on Feb. 7, 2020 and published in English under PCT Article 21(2), which itself claims benefit of U.S. provisional application Ser. No. 62/804,304, filed on Feb. 12, 2019. All documents above are incorporated herein in their entirety by reference.

FIELD OF THE DISCLOSURE

The present disclosure generally relates to the field of cosmetics, and more particularly to topical aqueous vitamin C compositions, and process for making same.

BACKGROUND OF THE DISCLOSURE

In mammals, Vitamin C is involved in all phases of wound healing. It is necessary for a normal response to physiological stressors, with this need increasing during times of injury. Events that cause wounding, including trauma or surgery are physiological stressors that have been associated with a decrease in blood plasma Vitamin C levels. In the inflammatory phase it is required for neutrophil apoptosis and clearance. During the proliferative phase, Vitamin C has been shown to regulate synthesis, maturation, secretion and degradation of collagen. Also, evidence suggests that Vitamin C may improve wound healing by stimulating quiescent fibroblasts to divide and by promoting their migration into the wounded area. Furthermore, studies have shown that Vitamin C protects the skin by increasing the capacity of fibroblasts to repair potentially mutagenic DNA lesions and acts as a powerful antioxidant and immune system modulator.

The numerous beneficial effects attributed to Vitamin C makes it a particularly remarkable active agent in cosmetic and wound healing applications. Humans lack the ability to store Vitamin C, so it is important to continually replenish this vitamin through dietary means and/or other means such as topical supplementation (MacKay, Douglas, N D, and Miller, Alan L., ND, 2003).

Although a variety of chemical forms of Vitamin C are available commercially, not all forms are equally absorbed or active. As an antioxidant, Vitamin C needs to remain in its unoxidized form in order to be effective. However, it is particularly subject to oxidative degradation. Vitamin C is a moderately strong reducing agent, which makes it unstable in aqueous solutions, especially at high pHs. Paradoxically, water is one of the best solvents to dissolve many active ingredients including Vitamin C. Ascorbic acid for example is relatively soluble in water (solubility of about 333 mg/ml) and is much less soluble in glycols such as propylene glycol (50 mg/ml) and in alcohols such as ethanol (10 mg/ml in absolute ethanol). Although water is the best solvent to provide a Vitamin C solution, it is paradoxically one of the worst solvents to protect it against oxidative damages. The problem to be solved with Vitamin C including ascorbic acid formulations has thus always been to find a compromise between solubilization and stability. Furthermore, because of its sensitivity, it can be a challenge to combine Vitamin C (especially in high concentrations) with certain active ingredients and excipients, while maintaining adequate stability activity of all components in the formulation.

The creation of stable topical skin care compositions thus often presents many difficulties and challenges due to the nature of the active ingredients and unpredictable interactions between components in the final formulation.

Despite the number of solutions that have been proposed, there thus remains a need for stable high content solubilized Vitamin C formulations in suitable concentrations, and which remain stable for a practical shipping and storage amount of time, and which keeps a clear substantially non-coloured (unoxidized) visual aspect for the required amount of time. There also remains a need for process of making same and methods of using same.

The present description refers to a number of documents, the content of which is herein incorporated by reference in their entirety.

SUMMARY OF THE DISCLOSURE

The present disclosure provides the following items:

Item 1. A cosmetic formulation comprising at least 16% of a vitamin C compound (w/w) and at least one cosmetically acceptable carrier.

Item 2. The formulation of item 1, wherein at least 20% of the vitamin C compound present in the formulation is in the form of ethyl ascorbate.

Item 3. The formulation of item 1 or 2, wherein the formulation comprises at least 20% of a vitamin C compound (w/w).

Item 4. The formulation of item 3, wherein the formulation comprises from 20% to about 40%, preferably about 20% to about 30%, of the vitamin C compound (w/w).

Item 5. The formulation of any one of items 1 to 4, wherein at least 30% of the vitamin C compound in the formulation is in the form of ethyl ascorbate.

Item 6. The formulation of item 5, wherein from 30% to about 60% of the vitamin C compound in the formulation is in the form of ethyl ascorbate.

Item 7. The formulation of any one of items 1 to 6, wherein the vitamin C compound is a mixture of L-ascorbic acid and ethyl ascorbate.

Item 8. The formulation of any one of items 1 to 7, wherein the at least one cosmetically acceptable carrier or excipient comprises a solvent, emulsifier and/or humectant.

Item 9. The formulation of item 8, wherein the solvent, emulsifier and/or humectant comprises an aqueous solvent, pentylene glycol, propylene glycol, butylene glycol, ethoxydiglycol, or any combination thereof.

Item 10. The formulation of item 9, wherein the solvent, emulsifier and/or humectant comprises ethoxydiglycol.

Item 11. The formulation of any one of items 8 to 10 wherein the at least one cosmetically acceptable carrier or excipient comprises an aqueous solvent.

Item 12. The formulation of item 11, wherein the aqueous solvent is water.

Item 13. The formulation of item 11 or 12, wherein the aqueous solvent is present in an amount of about 15% to about 25% (w/w).

Item 14. The formulation of item 13, wherein the aqueous solvent is present in an amount of about 18% to about 22% (w/w).

Item 15. The formulation of item 14, wherein the aqueous solvent is present in an amount of about 20%.

Item 16. The formulation of any one of items 9 to 15, wherein the solvent, emulsifier and/or humectant comprises a mixture of water, pentylene glycol, propylene glycol, butylene glycol and ethoxydiglycol.

Item 17. The formulation of any one of items 9 to 15, wherein the solvent, emulsifier and/or humectant comprises a mixture of water, ethoxydiglycol and propylene glycol.

Item 18. The formulation of any one of items 8 to 17, wherein the solvent, emulsifier and/or humectant is present in an amount of about 30% to about 70% (w/w) in the formulation.

Item 19. The formulation of item 18, wherein the solvent, emulsifier and/or humectant is present in an amount of about 40% to about 70% (w/w) in the formulation.

Item 20. The formulation of any one of items 1 to 19, wherein the at least one cosmetically acceptable carrier or excipient comprises a preservative and/or antioxidant.

Item 21. The formulation of item 20, wherein the preservative and/or antioxidant comprises a fruit extract.

Item 22. The formulation of item 21, wherein the fruit extract is a grapefruit extract.

Item 23. The formulation of any one of items 1 to 22, wherein the at least one cosmetically acceptable carrier or excipient comprises a fragrance.

Item 24. The formulation of item 23, wherein the fragrance is an apple fragrance.

Item 25. The formulation of any one of items 1 to 24, wherein the preservative and/or antioxidant comprises a primary polyamine.

Item 26. The formulation of item 25, wherein the primary polyamine is 1,4-Diaminobutane.

Item 27. The formulation of any one of items 1 to 26, wherein said formulation is a cream, an ointment, a lotion, a gel, a balm, or a serum.

Item 28. A method for reducing or ameliorating a skin condition in a subject comprising topically administering the formulation defined in any one of items 1 to 27 to the skin of the subject.

Item 29. The method of item 28, for reducing or ameliorating at least one of the following skin conditions: roughness, loss of skin thickness, flakiness, dehydration, tightness, lack of elasticity, lines, fine lines, wrinkles, loss of skin firmness, and spots.

Item 30. A method for preventing and/or treating a cutaneous sign of aging of a subject comprising topically administering the formulation of any one of items 1 to 27 to the skin of the subject.

Item 31. Use of the formulation of any one of items 1 to 27 for reducing or ameliorating a skin condition in a subject.

Item 32. Use of the formulation of any one of items 1 to 27 for the manufacture of a cosmetic composition for reducing or ameliorating a skin condition in a subject.

Item 33. The use of item 31 or 32, for reducing or ameliorating at least one of the following skin conditions: roughness, loss of skin thickness, flakiness, dehydration, tightness, lack of elasticity, lines, fine lines, wrinkles, loss of skin firmness, and spots.

Item 34. Use of the formulation of any one of items 1 to 27 for preventing and/or treating a cutaneous sign of aging of a subject.

Item 35. Use of the formulation of any one of items 1 to 27 for the manufacture of a cosmetic composition for preventing and/or treating a cutaneous sign of aging of a subject.

Item 36. Use of the formulation of any one of items 1 to 27 as a skin care agent.

Item 37. The use of any one of items 33 to 36, wherein the formulation is for topical administration.

Item 38. A process for preparing a cosmetic formulation comprising at least 16% of a vitamin C compound (w/w) and at least one cosmetically acceptable carrier, the process comprising:
 a) dissolving a first portion of the vitamin C compound in an aqueous solution;
 b) adding a first glycol-based solvent to the mixture of a);
 c) dissolving a second portion of the vitamin C compound in the mixture of b);
 d) adding a second glycol-based solvent to the mixture of c);
 e) dissolving a third portion of the vitamin C compound in the mixture of d);
 f) adding a third glycol-based solvent to the mixture of e);
 g) dissolving a fourth portion of the vitamin C compound in the mixture of f);
 h) adding a fourth glycol-based solvent to the mixture of g);
 i) adding a fifth portion of the vitamin C compound in the mixture of h) and heating; and
 j) adding a sixth portion of the vitamin C compound in the mixture.

Item 39. A process for preparing a cosmetic formulation comprising at least 16% of a vitamin C compound (w/w) and at least one cosmetically acceptable carrier, the process comprising:
 a) dissolving a first portion of the vitamin C compound in an aqueous solution;
 b) adding a first glycol-based solvent to the mixture of a);
 c) dissolving a second portion of the vitamin C compound in the mixture of b);
 d) adding a second glycol-based solvent to the mixture of c);
 e) dissolving a third portion of the vitamin C compound in the mixture of d);
 f) adding a third glycol-based solvent to the mixture of e);
 g) adding a fourth portion of the vitamin C compound in the mixture of h) and heating; and
 h) adding a fifth portion of the vitamin C compound in the mixture.

Item 40. The process of item 38 or 39, wherein at least 20% of the vitamin C present in the formulation is in the form of ethyl ascorbate.

Item 41. The process of item 40, wherein the first glycol-based solvent is Ethoxydiglycol.

Item 42. The process of item 38 or 41, wherein the second glycol-based solvent is 1,3-Butylene Glycol.

Item 43. The process of any one of items 38, 41 and 42, wherein the third glycol-based solvent is 1,3-Butylene Glycol.

Item 44. The process of any one of items 38 and 41-43, wherein the fourth glycol-based solvent is propylene Glycol.

Item 45. The process of item 39, wherein the first and second glycol-based solvent is ethoxydiglycol.

Item 46. The process of item 39 or 45, wherein the fourth glycol-based solvent is propylene Glycol.

Item 47. The process of any one of items 38 to 46, wherein the first portion of the vitamin C compound comprises about 10% to about 20% of the total amount of the vitamin C compound present in the final formulation.

Item 48. The process of any one of items 38 to 47, wherein the second portion of the vitamin C compound comprises about 5% to about 10% of the total amount of the vitamin C compound present in the final formulation.

Item 49. The process of any one of items 38 to 48, wherein the third portion of the vitamin C compound comprises about 5% to about 20% of the total amount of the vitamin C compound present in the final formulation.

Item 50. The process of any one of items 38 to 49, wherein the fourth portion of the vitamin C compound comprises about 5% to about 20% of the total amount of the vitamin C compound present in the final formulation.

Item 51. The process of any one of items 38 to 50, wherein the fifth portion of the vitamin C compound comprises about 5% to about 60% of the total amount of the vitamin C compound present in the final formulation.

Item 52. The process of any one of items 38 to 51, wherein, if present, the sixth portion of the vitamin C compound comprises about 30% to about 60% of the total amount of the vitamin C compound present in the final formulation.

Item 53. The process of any one of items 38 to 52, wherein the first, second, third, fourth and fifth portions of the vitamin C compound comprises L-ascorbic acid.

Item 54. The process of any one of items 38 to 53, wherein the fifth and, if present, sixth portions of the vitamin C compound comprises ethyl ascorbate.

Item 55. The process of any one of items 38 to 54, wherein the heating is at a temperature of about 35 to about 50° C.

Item 56. The process of item 55, wherein the heating is at a temperature of about 39 to about 43° C.

Item 57. The process of any one of items 38 to 56, wherein the heating is for a period of about 2 to about 20 minutes, preferably about 5 to about 10 minutes.

Item 58. The process of any one of items 38 to 57, wherein the dissolving comprises agitating or stirring the mixture.

Other objects, advantages and features of the present disclosure will become more apparent upon reading of the following non-restrictive description of specific embodiments thereof, given by way of example only with reference to the accompanying drawings.

DESCRIPTION OF ILLUSTRATIVE EMBODIMENTS

The articles "a," "an" and "the" are used herein to refer to one or to more than one (i.e., to at least one) of the grammatical object of the article.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, un-recited elements or method steps and are used interchangeably with, the phrases "including but not limited to" and "comprising but not limited to".

For the recitation of numeric ranges herein, each intervening number there between with the same degree of precision is explicitly contemplated. For example, for the range of 18-20, the numbers 18, 19 and 20 are explicitly contemplated, and for the range 6.0-7.0, the number 6.0, 6.1, 6.2, 6.3, 6.4, 6.5, 6.6, 6.7, 6.8, 6.9, and 7.0 are explicitly contemplated. The terms "such as" are used herein to mean, and is used interchangeably with, the phrase "such as but not limited to".

Unless otherwise defined herein, scientific and technical terms used in connection with the present disclosure shall have the meanings that are commonly understood by those of ordinary skill in the art. For example, any nomenclature used in connection with, and techniques of biochemistry, microbiology, chemistry and cosmetics described herein are those that are well known and commonly used in the art. The meaning and scope of the terms should be clear; in the event however of any latent ambiguity, definitions provided herein take precedent over any dictionary or extrinsic definition. Further, unless otherwise required by context, singular terms shall include pluralities and plural terms shall include the singular.

Practice of the methods, as well as preparation and use of the products and compositions disclosed herein employ, unless otherwise indicated, conventional techniques in chemistry and related fields as are within the skill of the art. These techniques are fully explained in the literature. See, for example, The Handbook of Pharmaceutical Excipients, American Pharmaceutical Association, Washington (Editors Raymond C Rowe, Paul J. Sheskey and Sian C. Owen, 2006).

As used herein, the term "active ingredient" refers to various types of optional additional active ingredients that may be used in formulations of the present disclosure. Actives are defined as skin benefit agents other than emollients and ingredients that merely improve the physical characteristics of the formulation (e.g., talc and silicas).

The present disclosure provides a stable Vitamin C formulation which comprises high concentrations of a Vitamin C compound, for example concentrations of more than 15%, and as high as 20% to 30%. It was found for example by the present inventors that the use of the vitamin C analog 3-O-Ethyl ascorbic acid (Ethyl Ascorbate) was suitable to achieve stable formulations with such high Vitamin C concentrations. The process to obtain the high concentration Vitamin C formulation comprises sequential addition of the vitamin C compound in suitable excipients with timely agitation and gentle heating.

In an aspect, the present disclosure provides a cosmetic formulation comprising at least 16% of a vitamin C compound (w/w) and at least one cosmetically acceptable carrier.

In an aspect, the present disclosure provides a cosmetic formulation comprising at least 16% (or 17%, 18%, 19%, 20%) of a vitamin C compound (w/w) and at least one cosmetically acceptable carrier or excipient, wherein at least 20% of the vitamin C compound present in the formulation is in the form of ethyl ascorbate.

The term "vitamin C compound" as used herein refers to vitamin C (also referred to as ascorbic acid, L-ascorbic acid, or ascorbate) as well as analogs of ascorbic acid such as ascorbyl esters (e.g., ascorbyl stearate, ascorbyl palmitate, ascorbyl dipalmitate, ascorbyl tetra-isopalmitate (VC-IP), ascorbyl 2-phosphate 6-palmitate), ascorbyl glucoside, 2-O-(beta-D-Glucopyranosyl) ascorbic acid, 3-O-Ethyl-L-Ascorbic Acid (ethyl ascorbate), ascorbic acid polypeptide as well as cosmetically acceptable salts of ascorbic acid or ascorbic acid analogs such as sodium ascorbate, zinc ascorbate, potassium ascorbate, calcium ascorbate, magnesium ascorbate, sodium ascorbylphosphate (SAP), magnesium ascorbylphosphate (MAP) and calcium ascorbylphosphate. In an embodiment, at least about 20%, 25%, 30%, 35%, 40%, 45%, 50%, 55%, 60%, 65% or 70% of the vitamin C in the formulation is in the form of ethyl ascorbate. In another embodiment, from about 20%, 25% or 30% to about 40%, 50%, 60%, 70% or 80% of the vitamin C present in the formulation is in the form of ethyl ascorbate. In an embodiment, the formulation comprises a mixture of ethyl ascorbate and another vitamin C compound, for example L-ascorbic acid or a cosmetically acceptable salt thereof. In an embodiment, the formulation comprises a mixture of ethyl ascorbate and L-ascorbic acid. In an embodiment, from about 20 to about 80% of the vitamin C present in the formulation is in the form of ethyl ascorbate and from about 20 to about 80% of the vitamin C present in the formulation is in the form of L-ascorbic acid. In an embodiment, from about 30 to about 70% of the vitamin C present in the formulation is in the form of ethyl ascorbate and from about 30% to about 70% of the vitamin C present in the formulation is in the form of L-ascorbic acid. In an embodiment, from about 30% to about 60% of the vitamin C compound in the formulation is in the form of ethyl ascorbate and from about 40% to about 70% of the vitamin C present in the formulation is in the form of L-ascorbic acid. In an embodiment, the formulation comprises at least 21%, 22%, 23%, 24%, 25%, 26%, 27%, 28%, 29% or 30% of a vitamin C compound (w/w). In an embodiment, the formulation comprises from about 20% to about 30%, 35% or 40% of a vitamin C compound (w/w).

The formulation according to the present disclosure comprise one or more cosmetically acceptable carrier or excipient(s). Carriers or excipients commonly used in topical compositions include, for example, solvents, oils (e.g. plant oils), aromas, sunscreens, colorants, pH modifiers, viscosity modifiers, emulsifiers, binders, diluents, emollients, skin irritants, thickeners, preservatives, antioxidants, stabilizers, humidifiers/humectants, skin penetration enhancers, vesicle wall formers, etc.

In an embodiment, the at least one cosmetically acceptable carrier or excipient comprises a solvent, emulsifier and/or humectant.

In an embodiment, the solvent, emulsifier and/or humectant comprises an aqueous solvent, such as water (e.g., demineralized water). In an embodiment, the aqueous solvent is present in an amount of about 10% or 15% to about 25% or 30% (w/w) in the formulation. In an embodiment, the aqueous solvent is present in an amount of about 15%, 16%, 17%, 18% or 19% to about 21%, 22%, 23%, 24% or 25% (w/w) in the formulation, in a further embodiment the aqueous solvent is present in an amount of about 20%.

In an embodiment, the solvent, emulsifier and/or humectant comprise one or more glycols, such as propylene glycol, dipropylene glycol, butylene glycol (e.g., 1,3-butylene glycol), pentylene glycol, lauroglycol, propylene glycol dipelargonate and/or ethoxydiglycol. In an embodiment, the one or more glycols are present in an amount of about 40% to about 70% (w/w), and preferably in an amount of about 45% to about 65% or 60%, for example in an amount of about 48% to about 60% in the formulation. In an embodiment, the one or more glycols are present in an amount of about 49 to about 50% or about 56% to about 60% (w/w) in the formulation.

In an embodiment, the solvent, emulsifier and/or humectant comprise ethoxydiglycol. In an embodiment, the ethoxydiglycol is present in an amount of about 15%, 16%, 17%, 18% or 19% to about 21%, 22%, 23%, 24% or 25% (w/w) in the formulation. In another embodiment, the ethoxydiglycol is present in an amount of about 1% or 2% to about 3%, 4% or 5% (w/w) in the formulation.

In an embodiment, the solvent, emulsifier and/or humectant comprise propylene glycol. In an embodiment, the propylene glycol is present in an amount of about 10%, 11%, 12%, 13%, 14% or 15% to about 25%, 26%, 27%, 28%, 29% or 30% (w/w) in the formulation. In an embodiment, the propylene glycol is present in an amount of about 15% or 16% to about 17% or 18% (w/w) in the formulation. In another embodiment, the propylene glycol is present in an amount of about 21% or 22% to about 24% or 25% (w/w) in the formulation.

In an embodiment, the solvent, emulsifier and/or humectant comprise pentylene glycol. In an embodiment, the pentylene glycol is present in an amount of about 8%, 9%, 10%, 11%, 12% or 13% to about 17%, 18%, 19%, or 20% (w/w), preferably from about 15% to about 17% (w/w), in the formulation.

In an embodiment, the solvent, emulsifier and/or humectant comprise butylene glycol. In an embodiment, the butylene glycol is present in an amount of about 8%, 9%, 10%, 11%, 12% or 13% to about 17%, 18%, 19%, or 20% (w/w), preferably from about 15% to about 17% (w/w), in the formulation.

In an embodiment, the solvent, emulsifier and/or humectant comprise an aqueous solvent, pentylene glycol, propylene glycol, butylene glycol, ethoxydiglycol, or any combination thereof. In an embodiment, the solvent, emulsifier and/or humectant comprises a mixture of water, ethoxydiglycol and propylene glycol. In another embodiment, the solvent, emulsifier and/or humectant comprises a mixture of water, pentylene glycol, propylene glycol, butylene glycol and ethoxydiglycol.

In an embodiment, the formulation comprises:
at least about 20%, preferably about 20% to about 30% (w/w), of a vitamin C compound;
about 30% to about 40%, preferably about 30% to about 35% (w/w), of ethoxydiglycol; and
about 20% to about 30%, preferably about 20% to about 25% (w/w), of propylene glycol.

In another embodiment, the formulation comprises:
at least about 20%, preferably about 20% to about 30% (w/w), of a vitamin C compound;
about 1% to about 5%, preferably about 2% to about 3% (w/w), of ethoxydiglycol;
about 20% to about 30%, preferably about 20% to about 25% (w/w), of propylene glycol
about 10% to about 20%, preferably about 15% to about 17% (w/w), of pentylene glycol; and
about 10% to about 20%, preferably about 15% to about 17% (w/w), of butylene glycol.

In an embodiment, the at least one cosmetically acceptable carrier or excipient comprises an antioxidant. As used herein, the term "antioxidant" refers to compounds, natural or synthetic, capable of neutralizing reactive oxygen species (ROS). Commonly used antioxidants in cosmetic compositions (topical compositions) include, for example, tocopherol (Vitamin E and derivatives thereof), isoflavones, polyphenols, and retinoids, (including retinoic acid (0.25% to 0.1%), tretinoin, retinal, retinol (0.1% to 5%), adapalene, tazorotene and retinyl esters. (Reviewed in Sheri L. Rolewski. Dermatology Nursing. 2003; 15(5), Jannetti Publications, Inc.), alpha lipoic acid, beta-glucan, coenzyme Q10, grape seed extract, grapefruit extract, amino acids, green tea, soybean sterols, ergothioneine (EGT, a thiourea derivative of histidine), Resorcinol, Carcinine, butylated hydroxytoluene (BHT), butylated hydroxyanisole (BHA), astaxanthin, alpha lipoic acid, tocotrienols, and mixtures thereof. In an embodiment, the antioxidant comprises a fruit extract, preferably a grapefruit extract. In an embodiment, the antioxidant is present in an amount of about 0.1% to about 5% (w/w), preferably about 0.1% to about 2% or about 0.5% to about 1% (w/w), in the formulation.

In an embodiment, the at least one cosmetically acceptable carrier or excipient comprises a fragrance. In an embodiment, the fragrance is a fruit fragrance, for example an apple fragrance. In an embodiment, the fragrance is present in an amount of about 0.01% to about 2% (w/w), preferably about 0.1% to about 1% or about 0.1% to about 0.5% (w/w), in the formulation.

The formulation according to the present disclosure may additionally comprise one or more further active ingredients (e.g., ingredients useful for reducing or preventing skin aging, skin irritation and inflammation, for improving skin texture, skin thickness, skin tone and/or skin healing). Non-limiting examples of active ingredients that may be added in compositions of the present disclosure include: retinol, lactic acid, kojic acid, proanthocyanamide, proanthocyanidins, wine extract, *Pseudoalteromonas* ferment extract, squalane, Di-C12-15-alkyl fumarate, castor oil, hydrolyzed wheat protein, hydrolyzed soy protein, glycine soja (soybean) protein, citrulline, tripeptide-1 (glycine-histidine-lysine), tripeptide-5, palmitoyl tripeptide-5, tripeptide-8, tripeptide-10, glycine, *Butyrospermum parkii* (shea) butter, *Argania spinosa* kernel oil, jojoba esters, glaucine, acetyl tetrapeptide-2, tetrapeptide 21, *Leontopodium alpinum callus* culture extract, acetylarginyltryptophyl diphenylglycine, *Carapa guaianensis* seed oil, glucose, hydrolyzed rice protein, superoxide dismutase, *Rosmarinus officinalis* (rosemary) leaf extract, cetearyl olivate, sorbitan olivate, *Ruscus aculeatus* root extract, *Centella asiatica* extract, hydrolyzed yeast protein, hydrolyzed casein, *Calendula officinalis* flower extract, *Dunaliella salina* extract, Acacia Senegal gum, *Crocus chrysanthus* bulb extract, *Opuntia ficus*-indica stem cell extract, *Bulbine frutescens* leaf juice, *Symphytum officinale callus* culture extract, acetyl hexapeptide-3, allantoin, bisabolol, *Citrus grandis* (grapefruit) extract, hydrolyzed glycosaminoglycans, hyaluronic acid, acetylated hyaluronic acid, sodium hyaluronate, hydrolyzed sodium hyaluronate, *Persea gratissima* (avocado) oil, tropolone, lysine-HCl, *Porphyridium cruentum* extract, dimethiconol, caprylic/capric triglyceride, Cytokinol™, phytonadione (Vitamin K), Vitamin E (tocopherols (e.g., γ-tocopherol, alpha-tocopherol) and tocotrienols), escin, panthenol, hexylresorcinol, Argireline, Kinetin, CE ferulic Acid, skin growth factors, Petrolatum/Canolin, dimethyl sulphoxide, coconut oil, keratolytic agents, unsaturated fatty acids (e.g., omega-3, omega-6 and omega-9 unsaturated fatty acids, especially omega-3 fatty acids, for example EPA, DHA and ALA) and derivatives (particularly esters) thereof, HMG-CoA reductase inhibitors, natural triterpenes, Coenzyme Q10 (ubiquinone), vitamin B3, hydroquinone (tocopheryl acetate), glycerine, ethyl linoleate, resveratrol, hydroxyresveratrol, Polyglyceryl-10 Oleate. Aloe, *Mallotus japonicus* extract, hydroxyacids (e.g., alpha hydroxy acids such as glycolic acid, beta hydroxyl acids such as salicylic acid), beta-(I,3) glucans, primary polyamines, extract of unpolished rice, urea, pine seed oil, marine collagens, soluble collagen, plant cell extracts, ceramides (NP, NS, EOS, EOP, AP), Caprooyl Phytosphingosine, Caprooyl Sphingosine, cholesterol, glutathione, carnitine, caffeine, *Rosa mosqueta* oil, cysteine derivatives, acid and alpha-amino acids, and salts of any of these. In an embodiment, the formulation further comprises a primary polyamine (e.g., polyazaalkane), for example putrescine (1,4-diaminobutane). Examples of primary polyamines include aminoacetonitrile, dansylcadaverine (1,5 diaminopentane), spermine, spermidine, and putrescine. In an embodiment, the primary polyamine is present in an amount of about 0.1% to about 5% (w/w), preferably about 0.1% to about 2% or about 0.2% to about 1% (w/w), in the formulation. In a further embodiment, the primary polyamine is putrescine.

The formulation according to the present disclosure may be in any form suitable for topical application, and may if desired include a carrier substrate, e.g. a woven or nonwoven web. The compositions may contain conventional topical composition components, such as for example, oils (e.g., plant oils), aromas, sunscreens, colorants, viscosity modifiers, binders, diluents, emollients, thickeners, preservatives, stabilizers, humidifiers, skin penetration enhancers, vesicle wall formers, antibiotics, antiseptics, etc.

Sunscreens include those materials commonly employed to block ultra-violet radiation. Illustrative compounds are the derivatives of para-aminobenzoic acid (PABA), cinnamate and salicylate. For example, avobenzophenone (Parsol™ 1789) octyl methoxycinnamate and 2-hydroxy-4-methoxy benzophenone (also known as oxybenzone) can be used. Octyl methoxycinnamate and 2-hydroxy-4-methoxy benzophenone are commercially available under the trademarks, Parsol™ MCX, Parsol™ HS and Benzophenone-3™, respectively. The exact amount of sunscreen employed in the compositions can vary depending upon the degree of protection desired from the sun's ultra-violet radiation. Additives that reflect or scatter the sun rays may also be employed. These additives include oxides like zinc oxide and titanium dioxide.

Non-limiting examples of conventional topical formulation components that may be included in compositions of the present disclosure include: lecithin, xanthan gum, carbomer, triethanolamine, phenoxyethanol, butylene glycol, caprylyl glycol, glyceryl stearate, PEG-100 stearate, PEG-75 stearate, PEG 40, dimethicone, glycerin, behenyl alcohol, behenic acid, cetyl palmitate, cyclopentasiloxane, dimethiconol, acrylates/acrylamide copolymer, magnesium aluminum silicate, methylparaben, ethylparaben, propylparaben, butylparaben, stearic acid, caprylic/capric triglyceride, titanium dioxide, triethoxycaprylylsilane, castor oil phosphate, tocopheryl acetate, tetrasodium EDTA, butylated hydroxy toluene, allyl methacrylates crosspolymer, polysorbate-20, polysorbate-85, carrageenan (*Chondrus crispus*), ethylhexylglycerin, cetyl alcohol, ceteareth-20, ceteareth-25, ceterayl alcohol, steareth-20, pentylene glycol, sodium benzoate, sodium dextran sulfate, potassium sorbate, ammonium glycyrrhizate, betaine, saccharide isomerate, trimethylolpropane, tricaprylate/tricaprate, cetyl alcohol, dmdm hydantoin, isobutylparaben, 1,2-hexanediol, 1,2-octanediol, hydrogenated palm glycerides, glyceryl polyacrylate, mineral oil, allyl methacrylate crosspolymer, glyceryl dilaurate, C13-14 isoparaffin, laureth-7, C12-13 pareth-23, Hexamidine Diisethionate, Petrolatum & derivatives, Benzoyl Peroxide, lanolin, isomalt, hydroxypropyl methylcellulose, Ammonium acryloyldimethyltaurate/VP copolymer, Aristoflex™ AVC, Novemer™ EC-1, Lipomulse™ 165, Lipomulse™ luxe, and SiCap™ 1500.

Anti-microbial and antibacterial compounds may be included in the formulations according to the present disclosure. Suitable preservatives include alkyl esters of p-hydroxybenzoic acid (parabens), hydantoin derivatives, hexamidine diisethionate, propionate salts, and a variety of quaternary ammonium compounds as well as chelating agents such as EDTA and well known antimicrobial non-parabens of all kinds.

The formulations accordingly to present disclosure have preferably a substantially acidic pH (i.e., pH 5 or 4 or below), generally from about pH 2 to about 4 or about pH 2.4 to about 3.5).

The form of the formulation according to the present disclosure can be any form normally used for cosmetics such as cream, emulsion, foam, gel, lotion, serum, milk, mousse, ointment, paste, powder, spray, or suspension. The cosmetic formulation can be any colored cosmetic used on the skin, hair, eyes, or lips, such as concealing sticks, foundation, stage make-up, mascara (cake or cream), eye shadow (liquid, pomade, powder, stick, pressed or cream), hair color, lipsticks, lip gloss, kohl pencils, eye liners, blushers, eyebrow pencils, and cream powders. Other exemplary cosmetic compositions include, but are not limited to, nail enamel, skin glosser stick, hair sprays, face powder, leg-makeup, insect repellent lotion, nail enamel remover, perfume lotion, and shampoos of all types (gel or liquid). In addition, the claimed formulation can be used in shaving cream (concentrate for aerosol, brushless, lathering), hair groom, cologne stick, cologne, cologne emollient, bubble bath, body lotion (moisturizing, cleansing, analgesic, astringent), after shave lotion, after bath milk and sunscreen lotion. In an embodiment, the formulation is in the form of a cream, an ointment, a lotion, a gel, a balm, or a serum, preferably the formulation is in the form of a serum.

The present disclosure also relates to a method for reducing or ameliorating a skin condition in a subject comprising topically administering the formulation defined herein to the skin of the subject. The present disclosure also relates to the use of the formulation defined herein for reducing or ameliorating a skin condition in a subject or for the manufacture of a cosmetic composition for reducing or ameliorating a skin condition in a subject. The present disclosure also relates to the formulation defined herein for use in reducing or ameliorating a skin condition in a subject.

Examples of skin conditions that may be treated with the formulation defined herein include skin inflammation, skin irritation, and/or skin's signs of aging. The formulation may also be used for promoting wound healing, for preventing or reducing the formation of hypertrophic scar tissue, for improving skin's thickness, for improving or reducing skin roughness, flakiness, dehydration, tightness, lack of elasticity, lines, fine lines, wrinkles, loss of skin firmness, and spots.

The present disclosure also relates to a method for preventing and/or treating a cutaneous sign of aging of a subject comprising topically administering the formulation defined herein to the skin of the subject. The present disclosure also relates to the use of the formulation defined herein for preventing and/or treating a cutaneous sign of aging of a subject, or for the manufacture of a cosmetic composition for preventing and/or treating a cutaneous sign of aging of a subject. The present disclosure also relates to the formulation defined herein for use in preventing and/or treating a cutaneous sign of aging of a subject.

General Manufacturing Procedures

Formulations of the present disclosure may be produced by standard cosmetic or pharmaceutical composition production techniques.

The selection of the right vitamin C compound (e.g. ethyl ascorbate) with the right solvents, which involves notably a high concentration of glycol-based solvents such as ethoxydiglycol, and of the right sequential additions of the vitamin C compound and glycol-based solvents under suitable agitation or stirring, all contribute to obtaining a stable solution of ascorbic acid. Gentle heating, for example at a temperature of about 35° C. to 50° C., and preferably at about 39-43° C. (e.g., 41° C.) for a short period of time (about 2-20 minutes, preferably about 5-10 minutes) has been shown to contribute to increasing the amount of solubilized vitamin C in the formulation.

In an embodiment, the agitation or stirring is performed at medium to high speed to allow micronization of the vitamin C compound into the solution, which is believed to reduce the oxidative damages to the vitamin C compound. The process provides for a solution that is stable upon long-term storage, without any substantial development of yellowish color, which often occurs at high vitamin C concentrations.

The present disclosure is illustrated in further details by the following non-limiting examples.

Example 1: Testing of Various High Content Vitamin C Compositions

Various approaches have been tested to try to obtain concentrated Vitamin C formulations (i.e., comprising more than 16% vitamin C, and preferably more than 20%) that are stable and/or that keep a clear substantially non-coloured (unoxidized) visual aspect following storage. The following compositions comprising between 20% and 30% Vitamin C have been prepared as described in below.

TABLE 1

Formula 1 comprising 20% Vitamin C (13% L-Ascorbic Acid and 7% Aminopropyl Ascorbyl Phosphate)

| Ingredient | Grade | % w/w |
| --- | --- | --- |
| Part A | | |
| Distilled water | USP | 13 |
| L-Ascorbic Acid | USP | 13 |
| Ethoxydiglycol (Transcutol ™ CG) | USP | 43 |
| Greentech Grapefruit Extract | MFR | 0.9 |
| Glycerin 99% | MFR | 3.22 |
| Propylene glycol | USP | 16.78 |
| Apple Crunch ™ fragrance | MFR | 0.1 |
| Part B | | |
| Distilled water | USP | 20 |
| Aminopropyl Ascorbyl Phosphate | | 7 |
| Total | | 117* |

*Excess water was removed to reach 100%

The composition according to Formula 1 was prepared under nitrogen atmosphere 5 psi at 4 inches from bulk surface as follows:

Part A
1. Heat distilled water to 30-35° C.;
2. Dissolution of 4% of the L-Ascorbic Acid in the water by mixing (under agitation around 190 rpm for 30 minutes and if needed homogenization);
3. Addition of half of the Transcutol™ CG (Ethoxydiglycol) to the mixture and mixing until dissolution;
4. Addition of 2% of the L-Ascorbic Acid to the mixture and mixing until dissolution;
5. Addition of the remaining half of the Transcutol™ CG to the mixture and mixing until dissolution;
6. Addition of 4% of the L-Ascorbic Acid to the mixture;
7. Addition of the Glycerin, Propylene Glycol and Greentech Grapefruit extract;
8. Addition of 3% of the L-Ascorbic Acid to the mixture, mixing for 5-10 minutes and heating to 41° C. until dissolution and quick heating to 50° C. for a very short time until completely clear;

9. Addition of the Apple Crunch to the mixture.

Part B
1. Heating water to 30-35° C.;
2. Addition of the Aminopropyl Ascorbyl Phosphate and mixing until clear Part C
Adding the solution of part B to the solution of part A and mixing until clear and homogenous.

Evaporate excess water to reach 100% (final concentration of water=16%)

Final pH of the formulation was about 3 (pH 3.00).

Stability/Visual: Precipitation (clear light amber liquid) after three months

TABLE 2

Formula 2 comprising 20% Aminopropyl Ascorbyl Phosphate

| Ingredient | Grade | % w/w |
|---|---|---|
| Part A | | |
| Distilled water | USP | 39 |
| Natrosol ™ 250 HHX | USP | 0.2 |
| Aloe Vera powder 200X | MFR | 0.4 |
| Sensiva ™ SC 50 | MFR | 0.4 |
| Ethoxydiglycol (Transcutol ™ CG) | USP | 10 |
| Part B | | |
| Distilled water | USP | 50 |
| Aminopropyl Ascorbyl Phosphate | | 20 |
| Total | | 120* |

*Excess water was removed to reach 100%

The composition according to Formula 2 was prepared under nitrogen atmosphere 5 psi at 4 inches from bulk surface as follows:

Part A
1. Addition of the Natrosol™ 250 HHX to water and mixing until hydrated;
2. Addition of the Aloe Vera powder 200X to the mixture and mixing until hydrated;
3. Addition of the Sensiva™ SC 50 to the mixture and mixing until homogenous;
4. Addition of the Ethoxydiglycol to the mixture and mixing until clear;

Part B
3. Heating water to 30-35° C.;
4. Addition of the aminopropyl Ascorbyl Phosphate and mixing until clear Part C
Adding the solution of part B to the solution of part A and mixing until clear and homogenous. Evaporate excess water to reach 100% (final concentration of water=69%)

Final pH of the formulation was about 2 (pH 1.83-2.00).

Stability/Visual: Clear light amber liquid.

TABLE 3

Formula 3 comprising 20% Aminopropyl Ascorbyl Phosphate and KTZ Interval Gold 120

| Ingredient | Grade | % w/w |
|---|---|---|
| Part A | | |
| Distilled water | USP | 39.45 |
| Natrosol ™ 250 HHX | USP | 0.3 |
| Aloe Vera powder 200X | MFR | 0.4 |

TABLE 3-continued

Formula 3 comprising 20% Aminopropyl Ascorbyl Phosphate and KTZ Interval Gold 120

| Ingredient | Grade | % w/w |
|---|---|---|
| Sensiva ™ SC 50 | MFR | 0.3 |
| Ethoxydiglycol (Transcutol ™ CG) | USP | 9.5 |
| Part B | | |
| Distilled water | USP | 50 |
| Aminopropyl Ascorbyl Phosphate | | 20 |
| KTZ Interval Gold | MFR | 0.05 |
| Total | | 120* |

*Excess water was removed to reach 100%

The composition according to Formula 3 was prepared under nitrogen atmosphere 5 psi at 4 inches from bulk surface as follows:

Part A
1. Addition of the Natrosol™ 250 HHX to water and mixing until hydrated;
2. Addition of the Aloe Vera powder 200X to the mixture and mixing until hydrated;
3. Addition of the Sensiva™ SC 50 to the mixture and mixing until homogenous;
4. Addition of the Ethoxydiglycol to the mixture and mixing until clear.

Part B
5. Heating water to 30-35° C.;
6. Addition of the aminopropyl Ascorbyl Phosphate and mixing until clear;
7. Addition of KTZ Interval Gold with mixing.

Part C
Adding the solution of part B to the solution of part A and mixing until clear and homogenous.

Evaporate excess water to reach 100% (final concentration of water=69.45%)

Final pH of the formulation was about 2.5 (pH 2.54).

Stability/Visual: Precipitation (golden liquid).

TABLE 4

Formula 4 comprising 20% Vitamin C (12.5% L-Ascorbic Acid and 7.5% Tetra Hexyldecyl Ascorbate (BV OSC))

| Ingredient | Grade | % w/w |
|---|---|---|
| Part A | | |
| Demineralized Water | USP | 20 |
| L-Ascorbic Acid | USP | 12.5 |
| Ethoxydiglycol (Transcutol ™ CG) | USP | 35.9 |
| Greentech Grapefruit Extract | MFR | 0.9 |
| Propylene glycol | USP | 22 |
| Apple Crunch ™ fragrance | MFR | 0.2 |
| Part B | | |
| BV OSC (Tetra Hexyldecyl Ascorbate) | MFR | 7.5 |
| Glycerox ™ HE (hydrophilic emollient ester) | MFR | 1 |
| Total | | 100 |

The composition according to Formula 4 was prepared under nitrogen atmosphere 5 psi at 4 inches from bulk surface as follows:

Part A
1. Addition of 4% of the L-Ascorbic Acid to the demineralized water and mixing until dissolution;
2. Addition of half (17.95%) of the Ethoxydiglycol to the mixture;
3. Addition of 2% of the L-Ascorbic Acid to the mixture and mixing until dissolution;

4. Addition of the remaining half (17.95%) of the Ethoxydiglycol to the mixture;
5. Addition of 4% of the L-Ascorbic Acid and the Propylene glycol and mixing until dissolution;
6. Addition of the Grapefruit Extract to the mixture;
7. Addition of 2.5% of the L-Ascorbic Acid to the mixture, mixing for 5-10 minutes and heating to 41° C. until dissolution (clear);
8. Addition of the Apple Crunch™ fragrance to the mixture.

Part B
Mixing of the Tetra Hexyldecyl Ascorbate and the Glycerox™ HE;

Part C
Addition of the solution of part B to the solution of part A and mixing until clear and homogenous.
Final pH of the formulation was about 3 (pH 2.90).
Stability/Visual: Clear but hazy gel-like texture. Appears in 2 phases oil-water

TABLE 5

Formula 5 comprising 20% Vitamin C (12.5% L-Ascorbic Acid and 7.5% Tetra Hexyldecyl Ascorbate (BV OSC)) and 0.8% Putrescine

| Ingredient | Grade | % w/w |
| --- | --- | --- |
| Demineralized Water | USP | 20 |
| L-Ascorbic Acid | USP | 12.5 |
| Ethoxydiglycol (Transcutol ™ CG) | USP | 35.1 |
| Greentech Grapefruit Extract | MFR | 0.9 |
| Propylene glycol | USP | 22 |
| Apple Crunch ™ fragrance | MFR | 0.2 |
| BV OSC (Tetra Hexyldecyl Ascorbate) | MFR | 7.5 |
| Glycerox HE | MFR | 1 |
| Putrescine dihydrochloride (1,4-Diaminobutane Dihydrochloride (DAB)) | MFR | 0.8 |
| Total | | 100 |

The composition according to Formula 5 was prepared under nitrogen atmosphere 5 psi at 4 inches from bulk surface as follows:

Part A
1. Addition of 4% of the L-Ascorbic Acid to the demineralized water and mixing until dissolution;
2. Addition of half of the Ethoxydiglycol to the mixture;
3. Addition of 2% of the L-Ascorbic Acid to the mixture and mixing until dissolution;
4. Addition of the remaining half of the Ethoxydiglycol to the mixture;
5. Addition of 4% of the L-Ascorbic Acid and the Propylene glycol and mixing until dissolution;
6. Addition of the Grapefruit Extract to the mixture;
7. Addition of 2.5% of the L-Ascorbic Acid to the mixture, mixing for 5-10 minutes and heating to 41° C. until dissolution (clear);
8. Addition of the Apple Crunch™ fragrance to the mixture.

Part B
Mixing of the Tetra Hexyldecyl Ascorbate and the Glycerox HE.

Part C
1. Addition of the solution of part B to the solution of part A and mixing until clear and homogenous;
2. Addition of the Putrescine dihydrochloride and mixing until dissolution.
Final pH of the formulation was about 3 (pH 2.90).
Stability/Visual: Clear but hazy gel-like texture. Appears in 2 phases oil-water

TABLE 6

Formula 6 comprising 20% Vitamin C (12.5% L-Ascorbic Acid and 7.5% Tetra Hexyldecyl Ascorbate (BV OSC)) and a solubilizing agent

| Ingredient | Grade | % w/w |
| --- | --- | --- |
| Part A | | |
| Demineralized Water | USP | 20 |
| L-Ascorbic Acid | USP | 12.5 |
| Ethoxydiglycol (Transcutol ™ CG) | USP | 35.9 |
| Greentech Grapefruit Extract | MFR | 0.9 |
| Propylene glycol | USP | 20.5 |
| Apple Crunch ™ fragrance | MFR | 0.2 |
| Part B | | |
| BV OSC (Tetra Hexyldecyl Ascorbate) | MFR | 7.5 |
| Solubilisant LRI ™* (non-ionic surfactants mixture) | MFR | 2.5 |
| Total | | 100 |

*INCI Name: PPG-26-Buteth-26 (and) PEG-40 Hydrogenated Castor Oil (and) Water

The composition according to Formula 6 was prepared under nitrogen atmosphere 5 psi at 4 inches from bulk surface as follows:

Part A
1. Addition of 4% of the L-Ascorbic Acid to the demineralized water and mixing until dissolution;
2. Addition of half (17.95%) of the Ethoxydiglycol to the mixture;
3. Addition of 2% of the L-Ascorbic Acid to the mixture and mixing until dissolution;
4. Addition of the remaining half (17.95%) of the Ethoxydiglycol to the mixture;
5. Addition of 4% of the L-Ascorbic Acid and the Propylene glycol and mixing until dissolution;
6. Addition of the Grapefruit Extract to the mixture;
7. Addition of 2.5% of the L-Ascorbic Acid to the mixture, mixing for 5-10 minutes and heating to 41° C. until dissolution (clear);
8. Addition of the Apple Crunch™ fragrance.

Part B
Mixing of the Tetra Hexyldecyl Ascorbate and the Solubilisant LRI™.

Part C
3. Addition of the solution of part B to the solution of part A and mixing until clear and homogenous;
Final pH of the formulation was about 3 (pH 3.11).
Stability/Visual: Hazy serum with white layer on top

TABLE 7

Formula 7 comprising 20% Vitamin C (12.5% L-Ascorbic Acid and 7.5% Ethyl Ascorbate (ET-VC))

| Ingredient | Grade | % w/w |
| --- | --- | --- |
| Demineralized Water | USP | 20 |
| L-Ascorbic Acid | USP | 12.5 |
| Ethoxydiglycol (Transcutol ™ CG) | USP | 35.9 |
| Greentech Grapefruit Extract | MFR | 0.9 |
| Propylene glycol | USP | 23 |
| Apple Crunch ™ fragrance | MFR | 0.2 |
| 3-O-Ethyl ascorbic acid (Ethyl Ascorbate) | MFR | 7.5 |
| Total | | 100 |

The composition according to Formula 7 was prepared under nitrogen atmosphere 5 psi at 4 inches from bulk surface as follows:
1. Dissolution of 4% of the L-Ascorbic Acid in the demineralized water by mixing;
2. Addition of half (17.95%) of the Transcutol™ CG (Ethoxydiglycol) to the mixture;
3. Addition of 2% of the L-Ascorbic Acid to the mixture and mixing until dissolution;
4. Addition of the remaining (17.95%) Transcutol™ CG to the mixture;
5. Addition of 4% of the L-Ascorbic Acid and the propylene glycol to the mixture and mixing until dissolution;
6. Addition of the Greentech Grapefruit extract;
7. Addition of 2.5% of the L-Ascorbic Acid to the mixture, mixing for 5-10 minutes and heating to 41° C. until dissolution (clear);
8. Addition of the Apple Crunch™ fragrance to the mixture;
9. Addition of the ethyl ascorbate and mixing until dissolution.

Final pH of the formulation was about 3 (pH 2.82).

Stability/Visual: Clear liquid Serum. Stability up to 12 months (no precipitates). Yellowish color after 9 months.

Example 2: Preparation of High Content Vitamin C Formulations Comprising 3-O-Ethyl Ascorbic Acid (Ethyl Ascorbate)

In view of the satisfactory results obtained with formula 7 that comprises the L-Ascorbic Acid derivatives 3-O-Ethyl ascorbic acid, other compositions comprising this derivative have been prepared.

TABLE 8

Formula 8 comprising 20% Vitamin C (12.5% L-Ascorbic Acid and 7.5% Ethyl Ascorbate (ET-VC)) and 0.8% Putrescine

| Ingredient | Grade | % w/w |
| --- | --- | --- |
| Demineralized Water | USP | 20 |
| L-Ascorbic Acid | USP | 12.5 |
| Ethoxydiglycol (Transcutol ™ CG) | USP | 35.1 |
| Greentech Grapefruit Extract | MFR | 0.9 |
| Propylene glycol | USP | 23 |
| Apple Crunch ™ fragrance | MFR | 0.2 |
| Ethyl Ascorbate | MFR | 7.5 |
| Putrescine dihydrochloride (1,4-Diaminobutane Dihydrochloride (DAB)) | MFR | 0.8 |
| Total | | 100 |

The composition according to Formula 8 was prepared under nitrogen atmosphere 5 psi at 4 inches from bulk surface as follows:
1. Dissolution of 4% of the L-Ascorbic Acid in the demineralized water by mixing;
2. Addition of half (17.95%) of the Transcutol™ CG (Ethoxydiglycol) to the mixture;
3. Addition of 2% of the L-Ascorbic Acid to the mixture and mixing until dissolution;
4. Addition of the remaining (17.95%) Transcutol™ CG to the mixture;
5. Addition of 4% of the L-Ascorbic Acid and the propylene glycol to the mixture and mixing until dissolution;
6. Addition of the Greentech Grapefruit extract;
7. Addition of 2.5% of the L-Ascorbic Acid to the mixture, mixing for 5-10 minutes and heating to 41° C. until dissolution (clear);
8. Addition of the Apple Crunch™ fragrance to the mixture;
9. Addition of the ethyl ascorbate and mixing until dissolution.
10. Addition of the Putrescine dihydrochloride and mixing until dissolution.

Final pH of the formulation was about 2.5 (pH 2.45).

Stability/Visual: Clear liquid serum

TABLE 9

Formula 9 comprising 30% Vitamin C (12.5% L-Ascorbic Acid and 17.5% Ethyl Ascorbate (ET-VC))

| Ingredient | Grade | % w/w |
| --- | --- | --- |
| Demineralized Water | USP | 20 |
| L-Ascorbic Acid | USP | 12.5 |
| Ethoxydiglycol (Transcutol ™ CG) | USP | 33 |
| Greentech Grapefruit Extract | MFR | 0.5 |
| Propylene glycol | USP | 16.4 |
| Apple Crunch ™ fragrance | MFR | 0.1 |
| Ethyl Ascorbate | MFR | 17.5 |
| Total | | 100 |

The composition according to Formula 9 was prepared under nitrogen atmosphere 5 psi at 4 inches from bulk surface as follows:
1. Dissolution of 5% of the L-Ascorbic Acid in the demineralized water by mixing;
2. Addition of half (16.5%) of the Transcutol™ CG (Ethoxydiglycol) to the mixture;
3. Addition of 2% of the L-Ascorbic Acid to the mixture and mixing until dissolution;
4. Addition of the remaining (16.5%) Transcutol™ CG to the mixture;
5. Addition of 4% of the L-Ascorbic Acid and the propylene glycol to the mixture and mixing until dissolution;
6. Addition of the Greentech Grapefruit extract;
7. Addition of 1.5% of the L-Ascorbic Acid to the mixture, mixing for 5-10 minutes and heating to 41° C. until dissolution (clear);
8. Addition of the Apple Crunch™ fragrance to the mixture;
9. Addition of the ethyl ascorbate and mixing until dissolution.

Final pH of the formulation was about 2.5 (pH 2.46).

Stability/Visual: Clear liquid serum

TABLE 10

Formula 10 comprising 20% Vitamin C (12.5% L-Ascorbic Acid and 7.5% Ethyl Ascorbate (ET-VC)) and 0.4% 1,4-Diaminobutane Dihydrochloride (DAB)

| Ingredient | Grade | % w/w |
| --- | --- | --- |
| Demineralized Water | USP | 19.6 |
| L-Ascorbic Acid | USP | 12.5 |
| Ethoxydiglycol (Transcutol ™ CG) | USP | 35.9 |
| Greentech Grapefruit Extract | MFR | 0.9 |
| Propylene glycol | USP | 23 |

TABLE 10-continued

Formula 10 comprising 20% Vitamin C (12.5% L-Ascorbic Acid and 7.5% Ethyl Ascorbate (ET-VC)) and 0.4% 1,4-Diaminobutane Dihydrochloride (DAB)

| Ingredient | Grade | % w/w |
| --- | --- | --- |
| Apple Crunch ™ fragrance | MFR | 0.2 |
| Ethyl Ascorbate | MFR | 7.5 |
| 1,4-Diaminobutane Dihydrochloride (DAB) | MFR | 0.4 |
| Total | | 100 |

The composition according to Formula 10 was prepared under nitrogen atmosphere 5 psi at 4 inches from bulk surface as follows:
1. Dissolution of 4% of the L-Ascorbic Acid in the demineralized water by mixing;
2. Addition of half (17.95%) of the Transcutol™ CG (Ethoxydiglycol) to the mixture;
3. Addition of 2% of the L-Ascorbic Acid to the mixture and mixing until dissolution;
4. Addition of the remaining (17.95%) Transcutol™ CG to the mixture;
5. Addition of 2% of the L-Ascorbic Acid to the mixture and mixing until dissolution;
6. Addition of the propylene glycol to the mixture and mixing until dissolution;
7. Addition of the Greentech Grapefruit extract;
8. Addition of 2.5% of the L-Ascorbic Acid to the mixture, mixing for 5-10 minutes and heating to 41° C. until dissolution (clear);
9. Addition of the Apple Crunch™ fragrance to the mixture;
10. Addition of the ethyl ascorbate and mixing until dissolution;
11. Addition of the DAB and mixing until dissolution.

Final pH of the formulation was about 3 (pH 2.82).
Stability/Visual: Clear liquid serum

TABLE 11

Formula 11 comprising 20% Vitamin C (12.5% L-Ascorbic Acid and 7.5% Ethyl Ascorbate (ET-VC)), 1,3-Butylene Glycol/Pentylene Glycol and 0.4% 1,4-Diaminobutane Dihydrochloride (DAB)

| Ingredient | Grade | % w/w |
| --- | --- | --- |
| Demineralized Water | USP | 19.6 |
| L-Ascorbic Acid | USP | 12.5 |
| Ethoxydiglycol (Transcutol ™ CG) | USP | 2.5 |
| 1,3-Butylene Glycol | MFR | 16.7 |
| Pentylene Glycol | MFR | 16.7 |
| Greentech Grapefruit Extract | MFR | 0.9 |
| Propylene glycol | USP | 23 |
| Apple Crunch ™ fragrance | MFR | 0.2 |
| Ethyl Ascorbate | MFR | 7.5 |
| 1,4-Diaminobutane Dihydrochloride (DAB) | MFR | 0.4 |
| Total | | 100 |

The composition according to Formula 11 was prepared under nitrogen atmosphere 5 psi at 4 inches from bulk surface as follows:
1. Dissolution of 4% of the L-Ascorbic Acid in the demineralized water by mixing;
2. Addition of the Transcutol™ CG (Ethoxydiglycol) to the mixture;
3. Addition of 2% of the L-Ascorbic Acid to the mixture and mixing until dissolution;
4. Addition of the 1,3-Butylene Glycol to the mixture;
5. Addition of 2% of the L-Ascorbic Acid to the mixture;
6. Addition of Pentylene Glycol to the mixture;
7. Addition of the propylene glycol to the mixture and mixing until dissolution;
8. Addition of the Greentech Grapefruit extract;
9. Addition of 2.5% of the L-Ascorbic Acid to the mixture, mixing for 5-10 minutes and heating to 41° C. until dissolution (clear);
10. Addition of the Apple Crunch™ fragrance to the mixture;
11. Addition of the ethyl ascorbate and mixing until dissolution;
12. Addition of the DAB and mixing until dissolution.

Final pH of the formulation was about 3 (pH 2.82).
Stability/Visual: Clear liquid serum

TABLE 12

Formula 12 comprising 20% Vitamin C (12.5% L-Ascorbic Acid and 7.5% Ethyl Ascorbate (ET-VC)) and 1,3-Butylene Glycol/Pentylene Glycol

| Ingredient | Grade | % w/w |
| --- | --- | --- |
| Demineralized Water | USP | 20 |
| L-Ascorbic Acid | USP | 12.5 |
| Ethoxydiglycol (Transcutol ™ CG) | USP | 2.5 |
| 1,3-Butylene Glycol | MFR | 16.7 |
| Pentylene Glycol | MFR | 16.7 |
| Greentech Grapefruit Extract | MFR | 0.9 |
| Propylene glycol | USP | 23 |
| Apple Crunch ™ fragrance | MFR | 0.2 |
| Ethyl Ascorbate | MFR | 7.5 |
| Total | | 100 |

The composition according to Formula 12 was prepared under nitrogen atmosphere 5 psi at 4 inches from bulk surface as follows:
1. Dissolution of 4% of the L-Ascorbic Acid in the demineralized water by mixing;
2. Addition of the Transcutol™ CG (Ethoxydiglycol) to the mixture;
3. Addition of 2% of the L-Ascorbic Acid to the mixture and mixing until dissolution;
4. Addition of the 1,3-Butylene Glycol to the mixture;
5. Addition of 2% of the L-Ascorbic Acid to the mixture;
6. Addition of Pentylene Glycol to the mixture;
7. Addition of 2% of the L-Ascorbic Acid to the mixture;
8. Addition of the propylene glycol to the mixture and mixing until dissolution;
9. Addition of the Greentech Grapefruit extract;
10. Addition of 2.5% of the L-Ascorbic Acid to the mixture, mixing for 5-10 minutes and heating to 41° C. until dissolution (clear);

11. Addition of the Apple Crunch™ fragrance to the mixture;
12. Addition of the ethyl ascorbate and mixing until dissolution.

Final pH of the formulation was about 3 (pH 2.82).
Stability/Visual: Clear liquid serum

TABLE 13

Formula 13 comprising 30% Vitamin C (12.5% L-Ascorbic Acid and 17.5% Ethyl Ascorbate (ET-VC)) and 1,4-Diaminobutane Dihydrochloride

| Ingredient | Grade | % w/w |
|---|---|---|
| Demineralized Water | USP | 19.6 |
| L-Ascorbic Acid | USP | 12.5 |
| Ethoxydiglycol (Transcutol ™ CG) | USP | 33 |
| Greentech Grapefruit Extract | MFR | 0.5 |
| Propylene glycol | USP | 16.4 |
| Apple Crunch ™ fragrance | MFR | 0.1 |
| Ethyl Ascorbate | MFR | 17.5 |
| 1,4-Diaminobutane Dihydrochloride (DAB) | MFR | 0.4 |
| Total | | 100 |

The composition according to Formula 13 was prepared under nitrogen atmosphere 5 psi at 4 inches from bulk surface as follows:
1. Dissolution of 5% of the L-Ascorbic Acid in the demineralized water by mixing;
2. Addition of half (16.5%) of the Transcutol™ CG (Ethoxydiglycol) to the mixture;
3. Addition of 2% of the L-Ascorbic Acid to the mixture and mixing until dissolution;
4. Addition of the remaining (16.5%) Transcutol™ CG to the mixture;
5. Addition of 4% of the L-Ascorbic Acid to the mixture;
6. Addition of the propylene glycol to the mixture and mixing until dissolution;
7. Addition of the Greentech Grapefruit extract;
8. Addition of 1.5% of the L-Ascorbic Acid to the mixture, mixing for 5-10 minutes and heating to 41° C. until dissolution (clear);
9. Addition of the Apple Crunch™ fragrance to the mixture;
10. Addition of the ethyl ascorbate and mixing until dissolution;
11. Addition of the DAB and mixing until dissolution.

Final pH of the formulation was about 2.5 (pH 2.46).
Stability/Visual: Clear liquid serum

TABLE 14

Formula 14 comprising 30% Vitamin C (12.5% L-Ascorbic Acid and 17.5% Ethyl Ascorbate (ET-VC)) and 1,3-Butylene Glycol/Pentylene Glycol

| Ingredient | Grade | % w/w |
|---|---|---|
| Demineralized Water | USP | 20 |
| L-Ascorbic Acid | USP | 12.5 |
| Ethoxydiglycol (Transcutol ™ CG) | USP | 2.5 |
| 1,3-Butylene Glycol | MFR | 15.25 |
| Pentylene Glycol | MFR | 15.25 |
| Greentech Grapefruit Extract | MFR | 0.5 |
| Propylene glycol | USP | 16.4 |
| Apple Crunch ™ fragrance | MFR | 0.1 |
| Ethyl Ascorbate | MFR | 17.5 |
| Total | | 100 |

The composition according to Formula 14 was prepared under nitrogen atmosphere 5 psi at 4 inches from bulk surface as follows:
1. Dissolution of 5% of the L-Ascorbic Acid in the demineralized water by mixing;
2. Addition of the Transcutol™ CG (Ethoxydiglycol) to the mixture;
3. Addition of 2% of the L-Ascorbic Acid to the mixture and mixing until dissolution;
4. Addition of the 1,3-Butylene Glycol to the mixture;
5. Addition of 2% of the L-Ascorbic Acid to the mixture;
6. Addition of Pentylene Glycol to the mixture;
7. Addition of 2% of the L-Ascorbic Acid to the mixture;
8. Addition of the propylene glycol to the mixture and mixing until dissolution;
9. Addition of the Greentech Grapefruit extract;
10. Addition of 1.5% of the L-Ascorbic Acid to the mixture, mixing for 5-10 minutes and heating to 41° C. until dissolution (clear);
11. Addition of the Apple Crunch™ fragrance to the mixture;
12. Addition of the ethyl ascorbate and mixing until dissolution.

Final pH of the formulation was about 2.5 (pH 2.46).
Stability/Visual: Clear liquid serum

TABLE 15

Formula 15 comprising 30% Vitamin C (12.5% L-Ascorbic Acid and 17.5% Ethyl Ascorbate (ET-VC)), 1,3-Butylene Glycol/Pentylene Glycol and 1,4-Diaminobutane Dihydrochloride

| Ingredient | Grade | % w/w |
|---|---|---|
| Demineralized Water | USP | 19.6 |
| L-Ascorbic Acid | USP | 12.5 |
| Ethoxydiglycol (Transcutol ™ CG) | USP | 2.5 |
| 1,3-Butylene Glycol | MFR | 15.25 |
| Pentylene Glycol | MFR | 15.25 |
| Greentech Grapefruit Extract | MFR | 0.5 |
| Propylene glycol | USP | 16.4 |
| Apple Crunch ™ fragrance | MFR | 0.1 |
| Ethyl Ascorbate | MFR | 17.5 |
| 1,4-Diaminobutane Dihydrochloride (DAB) | MFR | 0.4 |
| Total | | 100 |

The composition according to Formula 15 was prepared under nitrogen atmosphere 5 psi at 4 inches from bulk surface as follows:
1. Dissolution of 4% of the L-Ascorbic Acid in the demineralized water by mixing;
2. Addition of the Transcutol™ CG (Ethoxydiglycol) to the mixture;
3. Addition of 2% of the L-Ascorbic Acid to the mixture and mixing until dissolution;
4. Addition of the 1,3-Butylene Glycol to the mixture;
5. Addition of 2% of the L-Ascorbic Acid to the mixture;
6. Addition of Pentylene Glycol to the mixture;
7. Addition of 2% of the L-Ascorbic Acid to the mixture;
8. Addition of the propylene glycol to the mixture and mixing until dissolution;
9. Addition of the Greentech Grapefruit extract;
10. Addition of 2.5% of the L-Ascorbic Acid to the mixture, mixing for 5-10 minutes and heating to 41° C. until dissolution (clear);
11. Addition of the Apple Crunch™ fragrance to the mixture;

12. Addition of the ethyl ascorbate and mixing until dissolution;
13. Addition of the DAB and mixing until dissolution.

Final pH of the formulation was about 2.5 (pH 2.46).

Stability/Visual: Clear liquid serum

The scope of the claims should not be limited by the embodiments set forth in the examples but should be given the broadest interpretation consistent with the description as a whole.

The invention claimed is:

1. A process for preparing a cosmetic formulation comprising at least 16% of a vitamin C compound (w/w) and at least one cosmetically acceptable carrier, the process comprising:
   a) dissolving a first portion of the vitamin C compound in an aqueous solution, wherein the first portion of the vitamin C compound comprises L-ascorbic acid;
   b) adding a first glycol-based solvent to the mixture of a), wherein the first glycol-based solvent comprises ethoxydiglycol;
   c) dissolving a second portion of the vitamin C compound in the mixture of b), wherein the second portion of the vitamin C compound comprises L-ascorbic acid;
   d) adding a second glycol-based solvent to the mixture of c) wherein the second glycol-based solvent comprises ethoxydiglycol or 1,3-butylene glycol;
   e) dissolving a third portion of the vitamin C compound in the mixture of d), wherein the third portion of the vitamin C compound comprises L-ascorbic acid;
   f) adding a third glycol-based solvent to the mixture of e), wherein the third glycol-based solvent comprises propylene glycol;
   g) adding a fourth portion of the vitamin C compound in the mixture of f) and heating, wherein the fourth portion of the vitamin C compound comprises L-ascorbic acid; and
   h) adding a fifth portion of the vitamin C compound in the mixture, wherein the fifth portion of the vitamin C compound comprises ethyl ascorbate.

2. The process of claim 1, wherein at least 20% of the vitamin C present in the formulation is in the form of ethyl ascorbate.

3. The process of claim 1, wherein the first glycol-based solvent is ethoxydiglycol.

4. The process of claim 1, wherein the second glycol-based solvent comprises ethoxydiglycol.

5. The process of claim 1, wherein the second glycol-based solvent is ethoxydiglycol.

6. The process of claim 1, wherein the second glycol-based solvent is ethoxydiglycol.

7. The process of claim 1, wherein the third glycol-based solvent is propylene glycol.

8. The process of claim 1, wherein (i) the first portion of the vitamin C compound is L-ascorbic acid; (ii) the second portion of the vitamin C compound is L-ascorbic acid; (iii) the third portion of the vitamin C compound is L-ascorbic acid; (iv) the fourth portion of the vitamin C compound is L-ascorbic acid; (v) the fifth portion of the vitamin C compound is ethyl ascorbate; or (vi) a combination of at least two of (i) to (v).

9. The process of claim 1, wherein (i) the first portion of the vitamin C compound comprises about 10% to about 20% of the total amount of the vitamin C compound present in the final formulation; (ii) the second portion of the vitamin C compound comprises about 5% to about 10% of the total amount of the vitamin C compound present in the final formulation; (iii) the third portion of the vitamin C compound comprises about 5% to about 20% of the total amount of the vitamin C compound present in the final formulation; (iv) the fourth portion of the vitamin C compound comprises about 5% to about 20% of the total amount of the vitamin C compound present in the final formulation; (v) the fifth portion of the vitamin C compound comprises the remainder of the total amount of the vitamin C compound present in the final formulation; (vi) the heating is at a temperature of about 35 to about 50° C.; (vii) the heating is for a period of about 2 to about 20 minutes; (viii) the dissolving comprises agitating or stirring the mixture; or (ix) a combination of at least two of (i) to (viii).

10. The process of claim 1, wherein step f) further comprises adding an antioxidant plant extract after adding the third glycol-based solvent.

* * * * *